Oct. 11, 1966     B. D. LOVE     3,278,882

PRESSURE TRANSDUCERS

Filed March 10, 1964

INVENTOR.
BUDD D. LOVE
BY
*S.C.Yeaton*
ATTORNEY

United States Patent Office 3,278,882
Patented Oct. 11, 1966

3,278,882
PRESSURE TRANSDUCERS
Budd D. Love, Sunland, Calif., assignor to Sperry Rand Corporation, Great Neck, N.Y., a corporation of Delaware
Filed Mar. 10, 1964, Ser. No. 350,699
6 Claims. (Cl. 338—2)

This invention relates to a device for measuring fluid pressure and more specifically to a diaphragm type pressure cell utilizing resistance strain gauges.

Fluid pressure cells frequently employ a diaphragm that is exposed to a fluid whose pressure is to be measured. The resulting deflection of the diaphragm is sensed by an associated resistance strain gauge.

The strain gauges in many prior art devices are actuated through a linkage in order to multiply whatever motion is produced in the diaphragm. These linkages, however, are necessarily delicate. They cause error or failure when the pressure cell is subjected to shock or vibration.

Directly actuated prior art pressure cells in which the strain gauges are attached to the diaphragm itself are rugged and reliable but comparatively insensitive. The sensitivity in these directly actuated cells can be increased by making the diaphragm sufficiently thin. However, the strain in such thin diaphragms is not proportional to the applied pressure, therefore the linearity of the pressure cell is poor.

It is an object of the present invention to provide a pressure cell that is rugged yet sensitive.

It is another object of the present invention to provide a sensitive pressure cell that is mechanically simple.

It is still another object of the present invention to provide a sensitive pressure cell of high linearity.

These and other objects are accomplished by providing a directly actuated pressure cell in which the thickness of the diaphragm is so proportioned that the greatest bending strain is distributed over a large portion of the strain gauge.

Figure 1:
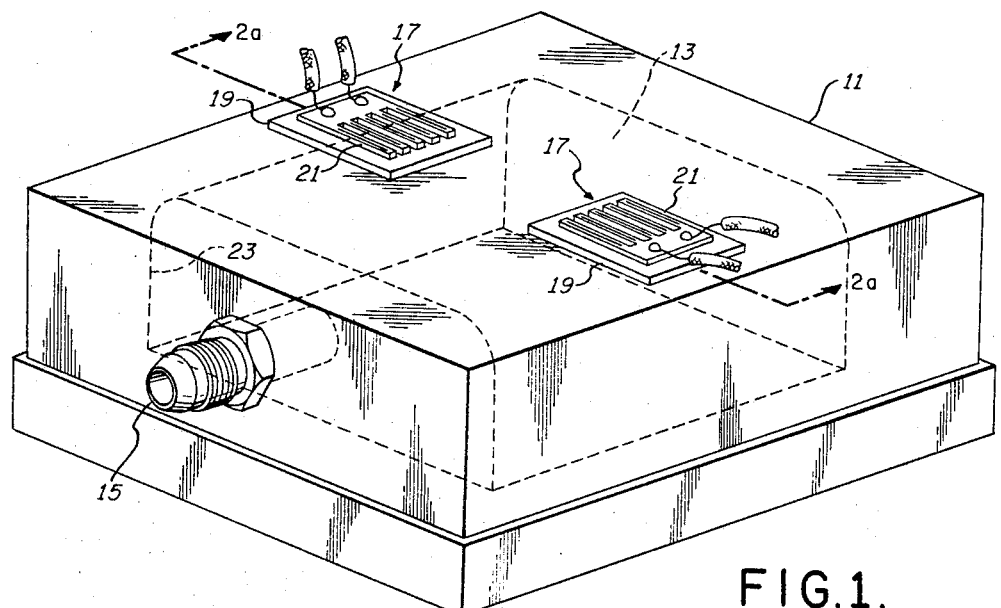
Figure 2A:
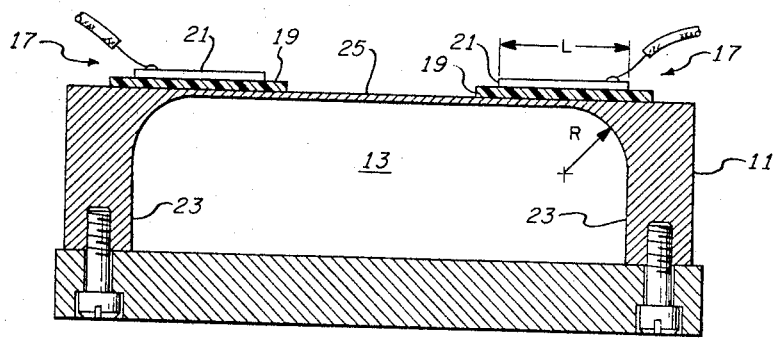
Figure 2B:
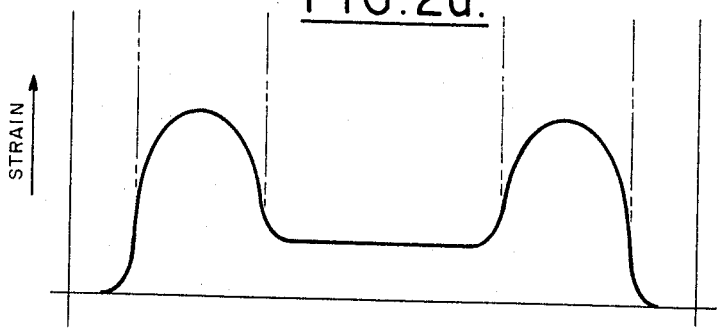

The structure and operation of the invention can be better understood by referring to the following description taken in conjunction with the accompanying drawings, wherein:

FIG. 1 is a perspective view of a pressure cell employing the principles of the invention, FIG. 2a is a cross sectional view taken along the lines 2—2 of FIG. 1, and FIG. 2b is a schematic graphical diagram useful in explaining the invention.

FIG. 1 depicts a pressure cell employing the principles of the invention. A rectangular housing 11 contains a cavity 13. Commuication between the cavity and an exterior source of pressure can be achieved by means of a coupling 15. The cavity is so dimensioned that the bottom and side walls of the housing are relatively thick whereas the top wall is formed as a comparatively thin diaphragm that deflects in response to the fluid pressure. Bonded strain gauges 17 are fastened to the outside of the top wall of the housing so as to be actuated by changes in the deflection of this member. Many types of commercial resistance strain gauges are suitable for this purpose, however metal film type strain gauges are presently preferred. Two strain gauges are shown for use with the pressure cell, however various arrangements of strain gauges may be used. A conventional Wheatstone bridge configuration may conveniently be used in which two additional gauges are also mounted on the housing 11, but in a region of substantially zero strain so as to provide temperature compensation. Such techniques are well-known in the art.

The details of the construction can be better understood by referring to FIG. 2a which represents a cross-sectional view taken along the line 2—2 of FIG. 1. The bonded strain gauges 17 typically comprise a backing material 19 that carries the active element 21 which has an active length L.

According to the principles of the present invention, the gauges are mounted so that the outer edge of the active elements 21 are aligned with the inner flat surfaces 23 of the side walls. A circularly arcuate fillet is provided at the junction of the top and side walls. This fillet has a radius R equal to one half of the active element length L.

The diaphragm 25 extends between the inner flat surfaces of the side walls. It is constructed with a uniformly thin membranous center section extending outwardly to the midpoint of the active elements of the strain gauges. This center section is made sufficiently thin so as to react as a membrane rather than a plate. That is, the fluid pressure within the measuring range causes the center section to deflect as a spheroidal shell, strained uniformly in tension, and having no neutral axis. Such a functional relationship can be achieved by proportioning the diaphragm so that this center section has a very small thickness-to-width ratio. Ratios smaller than 0.1 fulfill this requirement.

The diaphragm also includes an edge section extending outwardly from the center section. This edge section consists of the fillet and is subjected to a bending moment by the deflection of the center section.

The radial unit strain in the uppermost fiber of the diaphragm caused by a partial vacuum in cavity 13 is depicted qualitatively in the graph of FIG. 2b. The height of the curve at any point represents a typical unit strain in the corresponding section of the diaphragm. The central portion of the diaphragm exhibits a reasonably uniform strain. Maximum radial strain, it will be noticed, does not occur in the thin center section of the diaphragm, but rather in the thicker edge section or fillet region of the diaphragm. This maximum strain is distributed over a lateral distance that is approximately co-extensive with the length of the active element in the strain gauge. The design of the fillet in relation to the particular strain gauge being used thus provides a means for moving the maximum strain away from the region of the diaphragm immediately adjacent to the side wall and for spreading the maximum strain over a large portion of the active element of the strain gauge. Furthermore, the strain produced in the region of the fillet combined with the strain produced in the adjacent thin section of the diaphragm has been found to vary proportionately with fluid pressure to a close approximation even though a thin highly sensitive diaphragm is used.

The diaphragm is made an integral part of the side walls, rather than being merely clamped to these walls. This enhances the stability and reliability of the device.

Although the fillets have been described as having a circularly arcuate inner surface, some deviation from this shape can be tolerated without significantly impairing the operation of the device. A somewhat parabolic surface may be used, for instance, if this surface is made tangential to the inner flat surface of the diaphragm below the center of the strain gauge.

Although the device is primarily intended for measuring a partial vacuum, it will be appreciated that positive pressures may also be measured, although at a reduced sensitivity.

The presently preferred transducer uses a rectangular diaphragm, however the principles of the invention are equally applicable to a disc-shaped transducer using a circular diaphragm.

It is to be understood that the references to resistance strain gauges in the foregoing description is intended to include piezoresistive strain gauges as well as gauges employing ohmic resistance materials.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. In combination, a diaphragm having a flat exterior surface; a uniformly thin membranous center section in said diaphragm; an edge portion in said diaphragm extending outwardly from said center section, said edge portion having a non-uniform thickness defined by a circularly arcuate inner surface; means to apply fluid pressures to the surfaces of said diaphragm; and a strain gauge mounted on the exterior surface of said diaphragm so that the midpoint of its active element is aligned with the boundary between said center section and said edge portion.

2. A pressure transducer comprising a housing having a cavity therein, a diaphragm defining one wall of said cavity, a side wall supporting the diaphragm, a uniformly thin membranous center section in said diaphragm, an internal fillet at the junction of the diaphragm and the side wall, a bonded strain gauge attached to the outside surface of the diaphragm, and an active element in said strain gauge, said strain gauge being positioned over the fillet so that the outer edge of the active element lies in the plane of the inner surface of the side wall, said fillet having a radius equal to one-half the length of said active element.

3. A pressure transducer comprising a housing having a cavity therein, a diaphragm defining one wall of said cavity, a thin membranous center section in said diaphragm, a side wall supporting the diaphragm, an internal fillet at the junction of the diaphragm and the side wall, a bonded strain gauge attached to the outside of the diaphragm, and an active element in said strain gauge, said strain gauge being positioned over the fillet so that the outer edge of the active element lies in the plane of the inner surface of the side wall, said fillet having a radius equal to one-half the length of said active element, said fillet further having its inner surface tangential to the inner surface of said center section.

4. A pressure transducer comprising:
 (a) a housing having a cavity therein,
 (b) a diaphragm forming one wall of said cavity,
 (c) a side wall supporting said diaphragm,
 (d) a coupling for connecting the cavity to the source of fluid pressure to be measured,
 (e) a strain gauge mounted on the outside surface of the diaphragm,
 (f) an active element in said strain gauge,
 (g) said strain gauge being mounted so that the outer edge of the active element is aligned with the inner surface of the side wall,
 (h) a uniformly thin membranous center section in said diaphragm, said center section being sufficiently thin to be stressed only in tension by the fluid pressure to be measured, said center section extending outwardly to the midpoint of the active element in said strain gauge, and
 (i) an edge section in said diaphragm extending from the midpoint of the active element to the inner surface of the side wall, said edge section having a thickness that increases continuously to a maximum value at the inner surface of the outer wall.

5. A pressure transducer comprising:
 (a) a housing having a cavity therein,
 (b) a diaphragm forming one wall of said cavity,
 (c) a side wall supporting said diaphragm,
 (d) a strain gauge containing an active element, said strain gauge being mounted on the outside of the diaphragm so that the outer edge of the active element is in the plane of the inner surface of the side wall,
 (e) a uniformly thin membranous center section in said diaphragm, said center section being sufficiently thin to be stressed only in tension by the fluid pressure to be measured, said center section extending outwardly to the midpoint of the active element in said strain gauge, and
 (f) an edge section in said diaphragm, said edge section having a thickness that gradually increases to a maximum value at the inner surface of said outer wall.

6. A pressure transducer comprising:
 (a) a housing having a cavity therein,
 (b) a diaphragm forming one wall of said cavity,
 (c) a side wall supporting said diaphragm,
 (d) means to connect the cavity to a source of fluid pressure to be measured,
 (e) a strain gauge mounted on the outside of said diaphragm,
 (f) an active element in said strain gauge,
 (g) said strain gauge being mounted so that the outer edge of the active element is aligned with the inner surface of the side wall,
 (h) a uniformly thin membranous center section in said diaphragm extending outwardly to the midpoint of the active element of said strain gauge, and
 (i) an internal concave fillet at the junction of the diaphragm and the side wall, said fillet being tangent to the plane of the inner surface of said center section and to the inner surface of the side wall, said fillet further having a radius equal to one-half the length of the active element.

References Cited by the Examiner

UNITED STATES PATENTS

| | | | |
|---|---|---|---|
| 2,979,680 | 4/1961 | Bean | 338—2 X |
| 3,035,240 | 5/1962 | Starr | 338—4 |
| 3,075,160 | 1/1963 | Starr | 338—2 X |
| 3,128,628 | 4/1964 | Lebow | 73—88.5 X |
| 3,130,382 | 4/1964 | Laimins | 338—5 |
| 3,180,139 | 4/1965 | Soderholm | 73—141 |
| 3,213,400 | 10/1965 | Gieb | 338—5 X |

FOREIGN PATENTS 861,856  3/1961  Great Britain.

RICHARD M. WOOD, *Primary Examiner.*

W. D. BROOKS, *Assistant Examiner.*